March 4, 1930.          C. HARTER          1,749,135
                         PIPE CLAMP
               Filed April 19, 1928    2 Sheets-Sheet 1
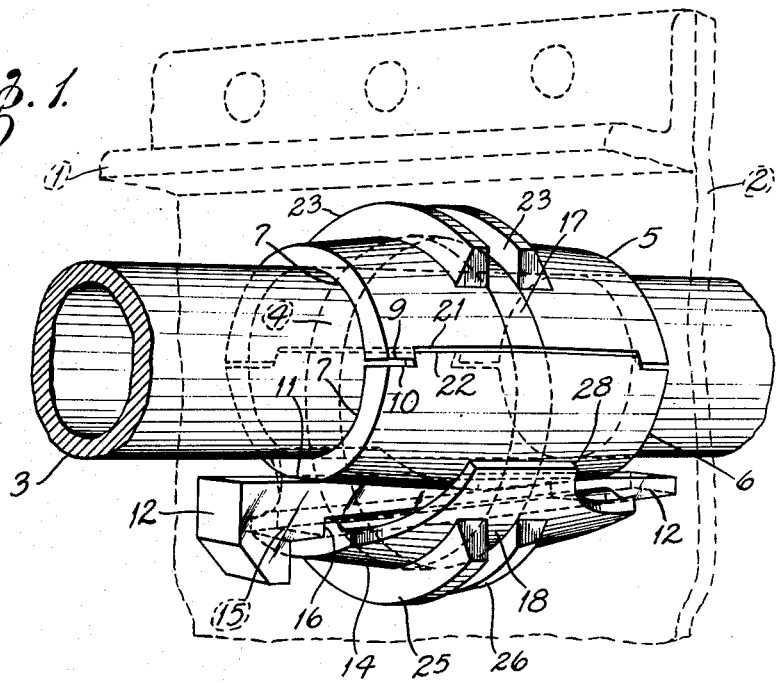
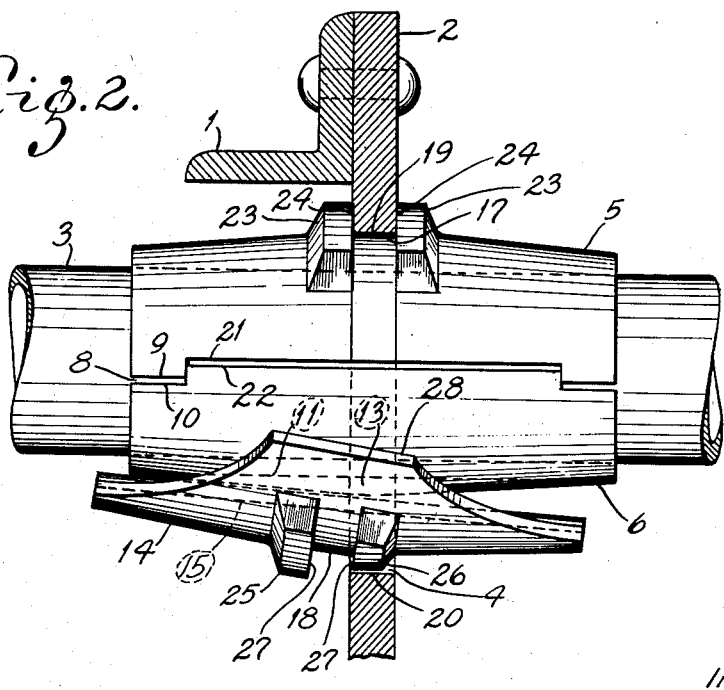
INVENTOR:
CHARLES HARTER.
By Albert J. McCauley
ATTORNEY.

March 4, 1930.  C. HARTER  1,749,135
PIPE CLAMP
Filed April 19, 1928   2 Sheets-Sheet 2

INVENTOR:
CHARLES HARTER.
By Albert J. McCauley
ATTORNEY.

Patented Mar. 4, 1930

1,749,135

UNITED STATES PATENT OFFICE

CHARLES HARTER, OF UNIVERSITY CITY, MISSOURI

PIPE CLAMP

Application filed April 19, 1928. Serial No. 271,145.

This invention relates to improvements in pipe clamps, and the device hereafter described may be used to secure pipe, such as air and steam pipe, to the underframe of a railway vehicle.

In securing pipes to a railway vehicle, it very frequently happens that the pipe must be placed very close to the frame of the vehicle, and in some cases the pipe must also pass through the diaphragms or like supporting members of the frame.

Such pipes are subject to much vibration in service, so they must be securely anchored in place, in order to prevent creeping or other displacement of the pipe.

Furthermore, the pipe should be rigidly fastened where it passes through the frame members of the vehicle, to prevent movement of the pipe relative to the frame members, as such movement is deleterious to the pipe and may often be a contributing cause of breakage thereof.

Various forms of pipe clamps have heretofore been proposed for this service, but I have found that these clamps are difficult to apply and use for several reasons, among which may be mentioned the fact that parts of such clamps are riveted to the vehicle frame, thus becoming a permanent fixture thereon. I find in actual practice that it is very difficult to apply and repair the ordinary clamps.

One of the objects of my invention, therefore, is to provide a pipe clamp that will securely fasten the pipe to the vehicle, and be readily detachable therefrom.

Another object is to provide a pipe clamp that that may be readily applied to new or old installations; that may be made to grip the pipe with very little effort on the part of the workman, and that may be securely interlocked with the frame of the vehicle in a simple and positive manner, without using rivets or the like.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Briefly stated, one form of my invention comprises a pair of interlocking clamping members gripping the pipe and extending through a support, or holder, provided with abutments to receive the clamping device. The space between the abutments is substantially larger than the diameter of the pipe, and the clamping members are positioned on the pipe and slid between said abutments to coact therewith in supporting and securing the pipe.

A wedge-receiving member is adapted to be interlocked with said support and is also slid into its position between said abutments so as to oppose the adjacent one of the clamping members.

When the parts are positioned as described, a wedge is driven between the wedge-receiving member and the adjacent clamping member, thereby clamping the pipe between the clamping members, and at the same time forcing the assembly into interlocked relation with the said support.

Fig. 1 is a perspective view of a device embodying the features of this invention clamped on a pipe and interlocked with a support, a portion of said support being shown in dotted lines.

Fig. 2 is a side elevation of Fig. 1 showing how the clamping members are positioned on the pipe in interlocked relation with each other, and how the wedge-receiving member is slid between one of said clamping members and the adjacent abutment formed on said support, the latter being shown in section.

Figure 4:
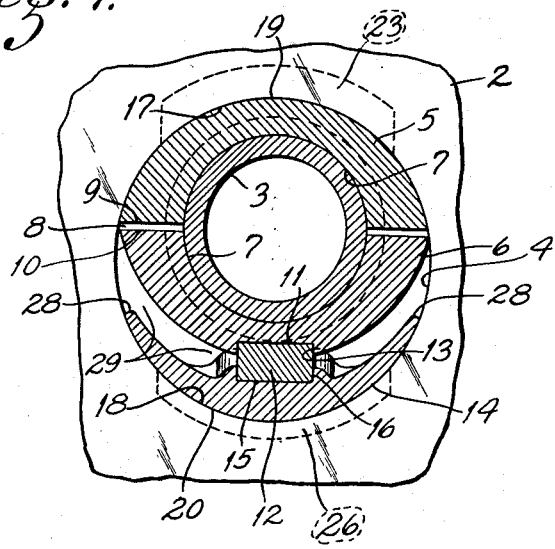
Fig. 4 is a sectional view along the line 4—4 of Fig. 3.

To illustrate one form of the invention, I have shown a frame member 1, such as may commonly be found on railway vehicles, and a support in the form of a diaphragm 2 associated with the frame member. An aperture 4 is provided in said diaphragm so as to provide opposed abutments 19 and 20 (Figures 2 and 4). A pipe 3 passes through said aperture 4, and the device shown is designed to securely and rigidly fasten the pipe 3 between said abutments 19 and 20.

The clamp includes a pair of clamping members 5 and 6 which cooperate to embrace the pipe 3 and for that purpose are formed with complementary pipe receiving recesses 7 (Figures 1 and 4), which closely fit the periphery of the pipe. In the embodiment shown, the clamping members 5 and 6 are substantially semicylindrical, but obviously they may be otherwise shaped and they may more or less completely embrace the pipe at the option of the person constructing the device.

Preferably a space, as at 8, (Figures 2 and 4) is left between the adjacent longitudinal edges 9 and 10 of the clamping members 5 and 6 when the device is mounted on the pipe. The edges 9 of the member 5 are each provided with a recess 21 formed complementary to corresponding interlocking elements 22 formed on each of the edges 10 of the clamping member 6 which interlock when the clamping members embrace the pipe 3.

Thus, longitudinal displacement of one clamping member relative to the other is prevented after the members are clamped to the pipe.

I will now describe the manner in which the clamping members are secured to the pipe.

Figure 3:
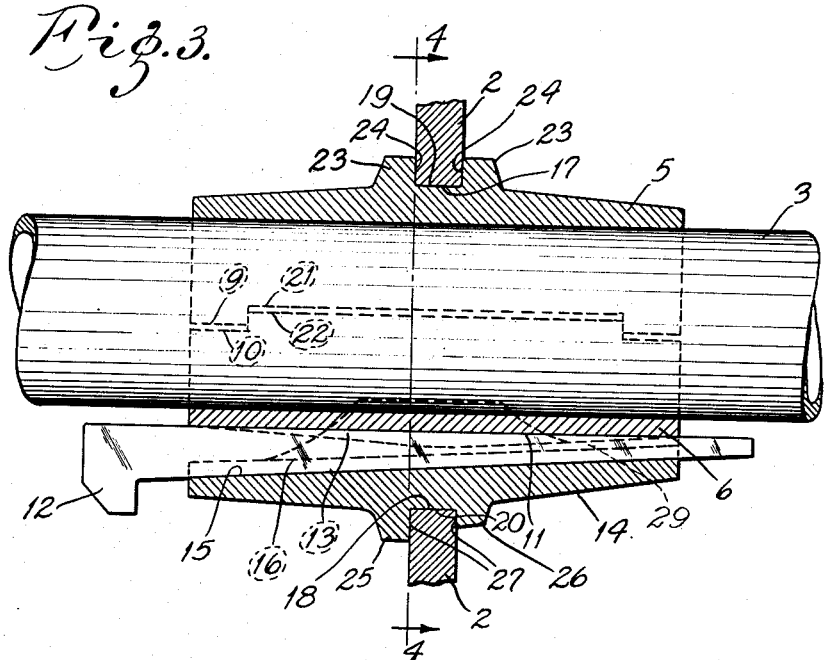
Fig. 3 is a longitudinal sectional view of the device.

The clamping member 6 is provided with a longitudinal seat or keyway 11 on its exterior side against which a wedge or key 12 is adapted to bear, (Figures 1 and 3). To guide the wedge I preferably provide oppositely disposed longitudinally extending shoulders 13 along said seat 11, which are most clearly indicated in Fig. 4.

The wedge 12 is driven between the clamping member 6 and the wedge-receiving member 14. In cross section this wedge-receiving member 14 is trough-like or arcuate, as is most clearly shown in Fig. 4 and in length the member 14 may be coextensive with the members 5 and 6. The member 14 is provided with a central longitudinal wedge-receiving seat or keyway 15, and spaced shoulders 16 are disposed on each side of and parallel with the seat 15 to guide the wedge 12 thereon.

The space between the abutments 19 and 20 formed by the aperture 4 in the support 2 is substantially larger than the diameter of the pipe 3. The clamping member 5 is disposed on the side of the pipe opposite the wedge-receiving member 14 and is provided with a peripheral seat 17 which is preferably concentric with the aperture 4 and is adapted to contact with and bear against a substantial portion of the abutment 19, formed by a portion of the wall of said aperture. This contact may extend over approximately a semi-circular arc of said aperture so as to distribute the bearing pressure over the abutment portion 19 thereof, (Fig. 4).

The wedge-receiving member 14 is provided with a peripheral seat 18 which is likewise concentric with the aperture 4 and is adapted to contact with and bear against a substantial portion of the abutment 20 formed by a wall of said aperture.

As shown in Fig. 4, the wedge-receiving member 14 is so constructed that, when the parts are assembled, the longitudinal side edges 28 and the shoulders 16 are spaced, as at 29, from the contiguous portions of the clamping member 6, in order to permit a vertical movement of said block 14 after the wedge 12 is withdrawn, whereby the member 14 may be removed from engagement with the support 2, as will hereinafter appear.

As is clearly shown in Fig. 4, the seat 17 of the clamping member 5 contacts with the abutment portion 19 of the wall of said aperture 4, and the seat 18 of the wedge-receiving member 14 contacts with the opposite abutment portion 20 of said wall. Thus the points of contact are oppositely disposed, and between them lie the pipe 3, clamping member 6, and wedge 12.

As shown in Fig. 3, the wedge seats 11 and 15 converge when the parts are in operative relation and the wedge 12, when driven between said seats 11 and 15, will force the seat 18 of the wedge-receiving member 14 into contact with the abutment 20, and will likewise force the clamping member 6 against the pipe 3. The pipe 3 in turn is forced against the clamping member 5, and the seat 17 of said member 5 is thus forced into contact with the abutment 19.

Thus the pipe 3 is firmly clamped to the support 2 between the abutments 19 and 20 thereof. I will now describe how the pipe and clamp are interlocked with the support 2.

The member 5 has on each side of and parallel with the seat 17, the oppositely disposed spaced lugs 23, having opposing faces 24 which receive and contact with the abutment 19 of the support 2 (Fig. 3). Likewise the wedge-receiving member 14 has, on each side of and parallel with the seat 18, the oppositely disposed spaced lugs 25 and 26, having opposing faces 27 which receive and contact with the abutment 20 of the support 2. The lug 26 does not extend as far from the seat 18 as does the lug 25.

When the pipe 3 is clamped in the aperture 4, as hereinbefore explained, and shown most clearly in Fig. 3, the lugs 23 interlock the clamping member 5 with the support 2, and likewise the lugs 25 and 26 interlock the wedge-receiving member 14 with the said support. The wedge 12 frictionally engages the wedge-receiving member 14 and also frictionally engages the clamping member 6, and the clamping members 5 and 6 are interlocked with each other by the elements 21 and 22 at their meeting edges. Thus the whole assembly is rigidly secured to and interlocked with the support 2. The reduced end of the wedge may be bent to prevent accidental displacement of said wedge after it has been driven to its operative position.

In describing how the clamp is used, attention was directed to Fig. 4, which clearly shows that the pipe 3 is eccentrically disposed in the space between the abutments 19 and 20.

In assembling the device (Fig. 2) the upper clamping member 5 is first applied against the underside of the pipe 5, and is then slid along the pipe into the aperture 4 between the abutments 19 and 20 until the lugs 23 are properly alined to receive the support 2. The member 5 is then moved circumferentially on the pipe to the position shown in Fig. 3, the lugs 23 receiving the edge of the abutments 19 and 20 between them.

Next the clamping member 6 is slid along the underside of the pipe and through the aperture 4 until the interlocking elements 21 and 22 are alined in position to be interlocked with each other.

The wedge-receiving member 14 is next passed through the aperture 4 in a manner as shown in Fig. 2. The reason for the difference in size of the lugs 25 and 26 will be readily understood from an inspection of the figure. As shown, the lug 26 is relatively small to allow the wedge-receiving member 14 to pass into the aperture 4, the lug 26 passing between the abutment 20 and the member 6.

Thereupon, the lug 25 engages the support 2 to prevent further movement, and the wedge-receiving member 14 drops down to receive a portion of the said support between the lugs 25 and 26, as shown in Fig. 3.

The pipe is gripped in the clamp and the clamp simultaneously interlocked with the support by the very simple procedure of driving the wedge 12 in place between the seats 11 and 15, whereupon the installation is complete, and the pipe will be rigidly supported between the abutments 19 and 20 in the aperture 4 and securely anchored to the support 2, the final assembly appearing as shown in Fig. 1.

To remove the clamp, the above described procedure is reversed, that is to say, the wedge 12 is withdrawn, then the wedge-receiving member 14, and next the member 6; whereupon the member 5 may be inverted and likewise removed.

In manufacturing the device, the parts may be made of any suitable material, such as malleable iron or drop forgings.

I claim:

1. A pipe clamp comprising oppositely disposed clamping members adapted to clamp the pipe, a retaining member separated from one of said clamping members, and a wedge located between said retaining member and the last mentioned clamping member, said wedge being movable independently of said members to force the clamping members into engagement with the pipe.

2. A pipe clamp comprising oppositely disposed clamping members adapted to clamp the pipe, said clamping members having meeting edges interlocked with each other, a retaining member separated from one of said clamping members, and a wedge located between said retaining member and the last mentioned clamping member, said wedge being movable independently of said members to force the clamping members into engagement with the pipe and to retain said edges in interlocking engagement with each other.

3. A pipe clamp comprising oppositely disposed clamping members adapted to clamp the pipe, said clamping members having meeting edges interlocked with each other, a retaining member separated from one of said clamping members, and a wedge located between said retaining member and the last mentioned clamping member, said wedge being movable independently of said members to force the clamping members into engagement with the pipe and to retain said edges in interlocking engagement with each other, said wedge having a flexible end adapted to be bent to secure all of said parts in their operative positions.

4. A pipe clamp comprising a pair of clamping members adapted to clamp the pipe, one of said clamping members being provided with elements adapted to interlock with a support for the clamping device, a retaining member separated from the other clamping member and also provided with elements adapted to interlock with said support, and a wedge arranged between said retaining member and the last mentioned clamping member, said wedge being movable independently of said members to force the clamping members into engagement with the pipe and to retain the interlocking elements in their operative positions.

5. A pipe clamp comprising a pair of clamping members adapted to clamp the pipe, said clamping members having meeting edges interlocked with each other, one of said clamping members being provided with elements adapted to interlock with a support for the clamping device, a retaining member separated from the other clamping member and also provided with elements adapted to interlock with said support, and a wedge arranged between said retaining member and the last mentioned clamping member, said wedge being movable independently of said members to force the clamping members into engagement with the pipe and to retain the interlocking elements in their operative positions.

6. In a device of the kind described, a support having opposed abutments, and a pipe clamp adapted to coact with said abutments to secure a pipe to said support, said clamp including clamping members, a wedge and wedge-receiving means whereby the clamp is simultaneously forced into engagement with said pipe and abutments, said clamp being provided with members which interlock with said support when the wedge is forced to its operative position.

7. In a device of the kind described, a pipe clamp adapted to lie between opposed abutments to grip a pipe, said clamp including a pair of clamping members interlocked with each other and adapted to embrace said pipe, a wedge-receiving member adapted to interlock with one of said abutments, a wedge between one of said clamping members and said wedge-receiving member, and interlocking elements on the other clamping member and also on said wedge-receiving member adapted to interlock with said abutments, said wedge being adapted to retain all of the interlocking elements in their operative position.

8. In a pipe clamp adapted to secure a pipe between opposed abutments, a pair of semi-cylindrical clamping members each having a longitudinal recess adapted to receive said pipe, one of said members having a peripheral abutment-engaging seat concentric with, and adapted to contact with an approximately semi-circular portion of one of the abutments, spaced lugs disposed on opposite sides of and parallel with said seat, the other of said clamping members having a longitudinal exterior wedge-receiving seat, interlocking elements formed on the adjacent longitudinal edges of said clamping members, said elements being adapted to interlock said clamping members with each other, a wedge-receiving member disposed between the other of said abutments and said wedge-receiving seat, the longitudinal side edges of said wedge-receiving member being spaced from the adjacent clamping member, said wedge-receiving member having a peripheral abutment-engaging seat concentric with, and adapted to contact with a substantial portion of the wall of one of said abutments, spaced lugs disposed on opposite sides of, and parallel with, the last mentioned abutment engaging seat, a wedge seat on said wedge-receiving member facing the first mentioned wedge-receiving seat, and a wedge adapted to contact with both of said wedge-receiving seats.

In testimony that I claim the foregoing I hereunto affix my signature.

CHARLES HARTER.